United States Patent
Jiang et al.

(10) Patent No.: US 12,212,245 B2
(45) Date of Patent: Jan. 28, 2025

(54) VOLTAGE CONVERSION CIRCUIT AND VOLTAGE CONVERSION METHOD

(71) Applicant: GUANGDONG OPPO MOBILE TELECOMMUNICATIONS CORP., LTD., Dongguan (CN)

(72) Inventors: Senlong Jiang, Dongguan (CN); Chih-Wei Chiu, Dongguan (CN); Chen Tian, Dongguan (CN); Jun Zhang, Dongguan (CN); Jialiang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 130 days.

(21) Appl. No.: 17/942,884

(22) Filed: Sep. 12, 2022

(65) Prior Publication Data

US 2023/0006562 A1   Jan. 5, 2023

Related U.S. Application Data

(63) Continuation of application No. PCT/CN2021/078474, filed on Mar. 1, 2021.

(30) Foreign Application Priority Data

Mar. 12, 2020   (CN) .......................... 202010172719.9

(51) Int. Cl.
*H02M 3/335*   (2006.01)
*H02M 7/219*   (2006.01)

(52) U.S. Cl.
CPC ....... *H02M 3/33573* (2021.05); *H02M 7/219* (2013.01)

(58) Field of Classification Search
CPC .......................... H02M 3/33573; H02M 7/219
See application file for complete search history.

(56) References Cited

U.S. PATENT DOCUMENTS

| 2007/0063684 | A1 | 3/2007 | Adragna et al. |
| 2007/0133239 | A1* | 6/2007 | Tanaka .............. H02M 3/33573 363/16 |

(Continued)

FOREIGN PATENT DOCUMENTS

| CN | 1812015 A | 8/2006 |
| CN | 202424533 U | 9/2012 |

(Continued)

OTHER PUBLICATIONS

The Second Office Action from corresponding Chinese Application No. 202010172719.9, dated Dec. 16, 2022 . English translation attached.

(Continued)

*Primary Examiner* — Sisay G Tiku
(74) *Attorney, Agent, or Firm* — Sheppard, Mullin, Richter & Hampton LLP

(57) ABSTRACT

The voltage conversion circuit includes a first direct-current conversion circuit connected to an electric load, a secondary transformer coil connected to the first direct-current conversion circuit, and a primary transformer coil coupled to the secondary transformer coil. The primary transformer coil is configured to generate, based on an initial voltage inputted to the primary transformer coil, an electromagnetic field and couple the electromagnetic field to the secondary transformer coil. The secondary transformer coil is configured to generate an induced current by virtue of the electromagnetic field, generate a secondary output voltage based on the induced current, and transmit the secondary output voltage to the first direct-current conversion circuit. The first direct-current conversion circuit is configured to adjust, based on (Continued)

a predetermined demand voltage of the electric load, the secondary output voltage to obtain a target voltage.

18 Claims, 9 Drawing Sheets

(56) References Cited

U.S. PATENT DOCUMENTS

| | | | |
|---|---|---|---|
| 2014/0266044 A1* | 9/2014 | Kang | B60L 53/20 |
| | | | 361/220 |
| 2018/0166903 A1* | 6/2018 | Sato | H02J 7/02 |
| 2019/0393777 A1 | 12/2019 | Giuliano | |
| 2022/0285947 A1* | 9/2022 | Qu | H02M 3/158 |
| 2023/0006558 A1* | 1/2023 | Jiang | H02M 3/33507 |
| 2023/0006563 A1* | 1/2023 | Jiang | H02M 7/219 |
| 2024/0006930 A1* | 1/2024 | Li | H02M 1/0048 |
| 2024/0128849 A1* | 4/2024 | Ammanamanchi | H02M 1/008 |

FOREIGN PATENT DOCUMENTS

| | | | | |
|---|---|---|---|---|
| CN | 105207256 A | | 12/2015 | |
| CN | 107431375 A | | 12/2017 | |
| CN | 207733021 U | | 8/2018 | |
| CN | 108832822 A | | 11/2018 | |
| CN | 109412452 A | | 3/2019 | |
| CN | 109687743 A | | 4/2019 | |
| CN | 109728732 A | | 5/2019 | |
| CN | 117526530 A | * | 2/2024 | |
| EP | 1906516 A1 | * | 4/2008 | ............ H02M 3/337 |
| JP | 2005073402 A | | 3/2005 | |
| WO | WO-2021179888 A1 | * | 9/2021 | .......... H02J 7/00034 |

OTHER PUBLICATIONS

The Rejection Decision from corresponding Chinese Application No. 202010172719.9, dated Aug. 17, 2023 . English translation attached.
International Search Report and Written Opinion dated May 24, 2021 in International Application No. PCT/CN2021/078474. English translation attached.
First Office Action from corresponding Chinese Application No. 202010172719.9, dated Apr. 27, 2022 . English translation attached.
Wang, Jianpu, "Urban Rail Transit Electric Traction and Control", Southwest Jiaotong University Press, pp. 136-139, Oct. 31, 2018. English translation attached.
The Third Office Action from corresponding Chinese Application No. 202010172719.9, dated May 26, 2023. English translation attached.
Extended European Search Report dated Jul. 17, 2023 received in European Patent Application No. EP21768049.5.
Exam Report dated Nov. 19, 2024 received in European Patent Application No. EP 21768049.5.

* cited by examiner

VOLTAGE CONVERSION CIRCUIT AND VOLTAGE CONVERSION METHOD

CROSS-REFERENCE TO RELATED APPLICATIONS

This application is a continuation of International Application No. PCT/CN2021/078474, filed on Mar. 1, 2021, which claims priority to Chinese Patent Application No. 202010172719.9, filed on Mar. 12, 2020. The disclosures of the aforementioned applications are hereby incorporated by reference in their entireties

FIELD

The present disclosure relates to the field of power supplies, and more particularly, to a power supply conversion circuit and a power supply conversion method.

BACKGROUND

At present, to allow a power supply conversion circuit to adjust an output voltage based on requirements of an electric load, in a common method, a separate coil feedback winding is added on a primary coil side of a transformer in the power supply conversion circuit, and through the coil feedback winding, a demand voltage of the electric load is transferred to the primary coil side of the transformer; or a resistor is disposed on a secondary coil side of the transformer to divide a voltage, a voltage feedback signal of the electric load is transmitted to the primary coil side of the transformer by a comparator and an optocoupler, and by a control circuit on the primary coil side of the transformer based on the voltage feedback signal, an output voltage on the secondary coil side of the transformer is adjusted to a voltage value desired by the electric load. However, these two feedback schemes, due to a long feedback loop and poor real-time performance of adjustment, both have a reduced efficiency of a voltage conversion.

SUMMARY

Embodiments of the present disclosure provide a power supply conversion circuit and a power supply conversion method, capable of improving efficiency of a power supply conversion.

Implementations of technical solutions of the present disclosure are provided below. A power supply conversion circuit is provided by the present disclosure. The power supply conversion circuit includes a primary transformer coil, a secondary transformer coil, and a first direct-current conversion circuit. The primary transformer coil is coupled to the secondary transformer coil. The secondary transformer coil is connected to the first direct-current conversion circuit. The first direct-current conversion circuit is connected to an electric load. The primary transformer coil is configured to generate, based on an initial voltage inputted to the primary transformer coil, an electromagnetic field and couple the electromagnetic field to the secondary transformer coil. The secondary transformer coil is configured to generate an induced current by virtue of the electromagnetic field, generate a secondary output voltage based on the induced current, and transmit the secondary output voltage to the first direct-current conversion circuit. The first direct-current conversion circuit is configured to adjust, based on a predetermined demand voltage of the electric load, the secondary output voltage to obtain a target voltage.

The embodiments of the present disclosure provide a power supply conversion method. The method is applied in the above-mentioned power supply conversion circuit as described above. The method includes: generating, by the primary transformer coil based on an initial voltage inputted to the primary transformer coil, the electromagnetic field, and coupling the electromagnetic field to the secondary transformer coil; generating, by the secondary transformer coil based on the electromagnetic field, the induced current, generating the secondary output voltage based on the induced current, and transmitting the secondary output voltage to the first direct-current conversion circuit; and adjusting, by the first direct-current conversion circuit based on the predetermined demand voltage of the electric load, the secondary output voltage to obtain the target voltage.

DESCRIPTION OF EMBODIMENTS

Figure 1:
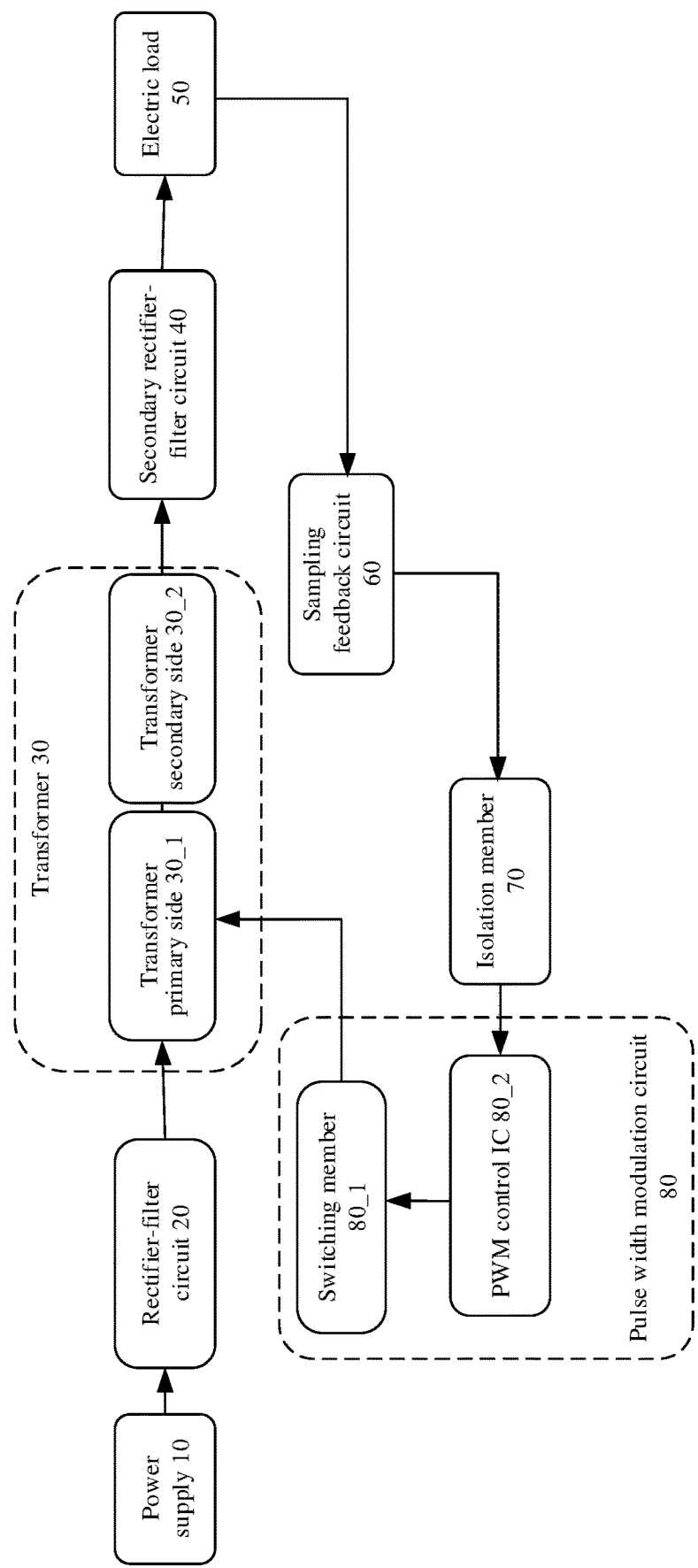
FIG. 1 illustrates a structure of an existing power supply conversion circuit.

At present, an electric appliance, when powered by a power supply, usually requires different voltages from the power supply. For example, during charging of a cell phone supporting a Universal Serial Bus Power Delivery (USB-PD) protocol, an initial alternating current voltage supplied by the power supply needs to be converted into a continuously adjustable direct current voltage. An existing common voltage adjustment method may be as illustrated in FIG. 1. FIG. 1 illustrates a structure of an existing power supply conversion circuit, in which a power supply 10 is configured to provide an alternating current, and a rectifier-filter circuit 20 and a pulse width modulation circuit 80 are configured to convert the alternating current into a pulse square wave. The pulse square wave is applied to a coil on a transformer primary side 30_1 of the transformer 30. The coil on the transformer primary side 30_1 is configured to generate an induced electromagnetic field based on the pulse square wave and couple the induced electromagnetic field to a coil on a transformer secondary side 30_2. The coil on a transformer secondary side 30_2 is configured to generate an induced current based on the induced electromagnetic field, and determine, based on a ratio of winding turns of the coil on the transformer primary side 30_1 to winding turns of the coil on the transformer secondary side 30_2, an output voltage on the transformer secondary side 30_2. The induced current on the transformer secondary side 30_2 is converted into a direct current by a secondary rectifier-filter circuit 40T, and the direct current is provided to an electric load 50. In the structure of the power supply conversion circuit illustrated in FIG. 1, the electric load 50 may feed, via a dedicated sampling feedback circuit 60 and an isolation member 70 (generally a signal isolation conversion chip configured to isolate a current of the coil on the transformer primary side from a current of the coil on the transformer secondary side), a demand voltage magnitude in a form of a power supply feedback signal back to the transformer primary side 30_1. Through the pulse width modulation circuit 80, a voltage applied on the transformer primary side 30_1 is adjusted based on the power supply feedback signal. Therefore, the output voltage on the transformer secondary side 30_2 can be changed based on a fixed ratio of winding turns in the transformer 30.

Figure 2:
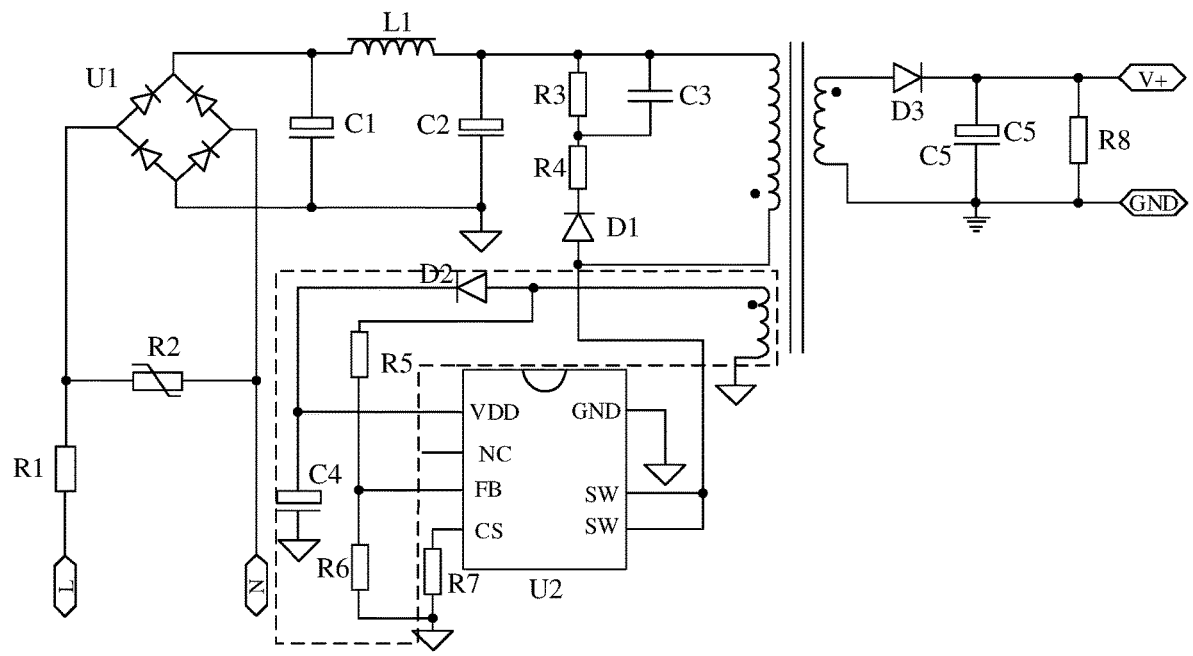
FIG. 2 illustrates a structure of an existing dedicated coil feedback power supply conversion circuit.

In one of the conventional applications, based on the structure of the power supply conversion circuit illustrated in FIG. 1, the sampling feedback circuit 60 may consist of a separate dedicated feedback coil winding, a reverse bias cut-off diode D2, a resistor R5, and a resistor R6, as illustrated in a dashed box in FIG. 2. The dedicated feedback coil winding is configured to obtain the power supply feedback signal from the coil on the transformer secondary side. The resistor R5 and the resistor R6 are configured to adjust the output voltage of the coil on the transformer secondary side. As can be seen from FIG. 2, a switching power supply chip U2 may be configured to obtain information of an output voltage V+ through the feedback coil winding. When a magnitude of the output voltage V+ needs to be adjusted based on a demand voltage of the electric load, an adjustment loop may be as follows: the power supply feedback signal is fed back to the pulse width modulation circuit by the electric load via the isolation member; a sampling voltage is obtained by the pulse width modulation circuit from a transformer feedback winding, and a pulse width or frequency of the pulse square wave is adjusted to obtain the output voltage. Therefore, such an adjustment loop has a long feedback loop and poor real-time performance of an adjustment. Further, due to defects of the transformer such as leakage inductance and leakage flux, a primary transformer coil, a secondary transformer coil, and a feedback winding cannot ideally have a proportional relationship strictly determined by the turn ratio. In this way, it has poor accuracy to control the output voltage on the transformer secondary side by feeding, via the dedicated feedback winding, the sampling voltage signal back.

Figure 3:
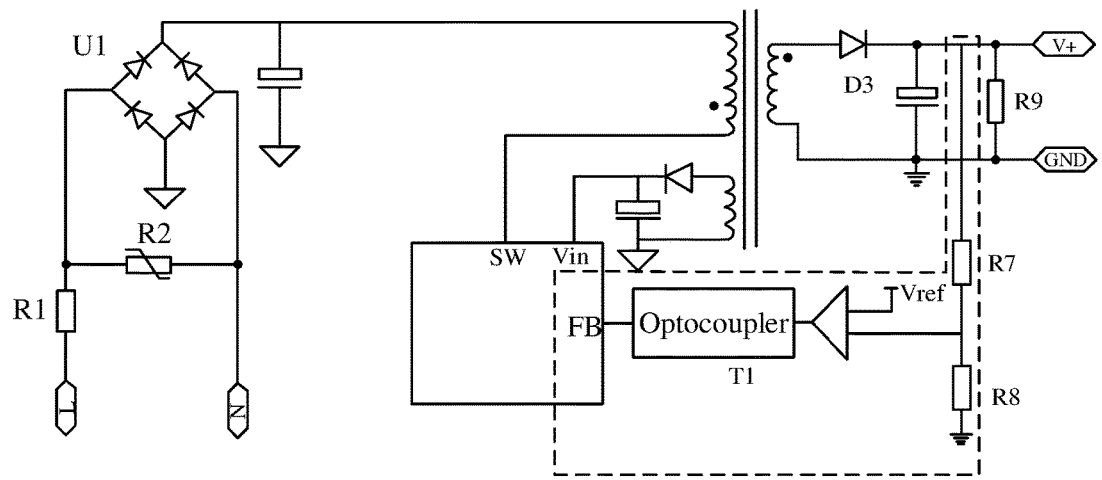
FIG. 3 illustrates a structure of an existing optocoupler-type power supply conversion circuit.

In another conventional application, based on the structure of the power supply conversion circuit illustrated in FIG. 1, the sampling feedback circuit 60 may also be as illustrated in a dashed box in FIG. 3. The output voltage on the transformer secondary side is divided by a resistor R7 and a resistor R8. The divided sampling voltage is transmitted to a comparator. The comparator may transmit a result of a comparison between the sampling voltage and a reference voltage Vref to an optocoupler chip T1. The optocoupler chip T1 may transmit an isolated feedback signal to an FB interface of a control chip on the transformer primary side. The control chip may adjust, based on the signal returned from the optocoupler chip, a PWM pulse width or frequency on the coil on the transformer primary side. A voltage adjustment circuit illustrated in FIG. 3 requires the use of an optocoupler chip as a signal isolation member between the transformer primary side and the transformer secondary side, with a long path for a feedback sampling voltage signal to be returned to a pulse width control circuit. In addition, a speed of the optocoupler chip cannot meet higher response requirements.

In addition, in the above conventional applications, a circuit for controlling a voltage is mainly located on the primary side of the transformer, thereby leading to a high voltage on the primary side. The required high voltage resistance device usually has a large package but a low capacitance value, which affects an overall size of the circuit.

Figure 4:
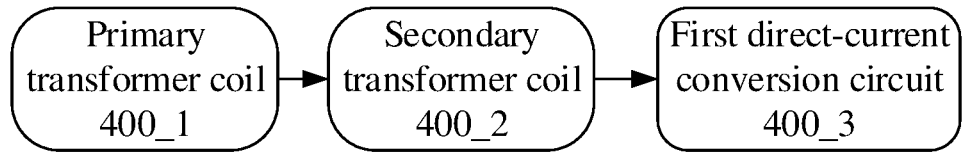
FIG. 4 is a first structural schematic diagram of a power supply conversion circuit according to an embodiment of the present disclosure.

The present disclosure provides a power supply conversion circuit as illustrated in FIG. 4. FIG. 4 is a structural schematic diagram of a power supply conversion circuit according to an embodiment of the present disclosure. Referring to FIG. 4, the power supply conversion circuit includes a primary transformer coil 400_1, a secondary transformer coil 400_2, and a first direct-current conversion circuit 400_3. The primary transformer coil 400_1 is coupled to the secondary transformer coil 400_2. The secondary transformer coil 400_2 is connected to the first direct-current conversion circuit 400_3. The first direct-current conversion circuit 400_3 is connected to an electric load. The primary transformer coil 400_1 is configured to generate, based on an initial voltage inputted to the primary transformer coil 400_1, an electromagnetic field and couple the electromagnetic field to the secondary transformer coil 400_2. The secondary transformer coil 400_2 is configured to generate an induced current based on the electromagnetic field, generate a secondary output voltage based on the induced current, and transmit the secondary output voltage to the first direct-current conversion circuit 400_3. The first direct-current conversion circuit 400_3 is configured to adjust, based on a predetermined demand voltage of the electric load, the secondary output voltage to obtain a target voltage.

In the embodiment of the present disclosure, the initial voltage is provided by a power supply. The initial voltage and an initial current that are provided by an output end of the power supply are applied to the primary transformer coil of the transformer, allowing the primary transformer coil of the transformer to generate the electromagnetic field. By means of the electromagnetic field, electric energy from the primary transformer coil is coupled to the secondary transformer coil. The secondary transformer coil may generate, through the induced electromagnetic field, the induced current, so as to generate the secondary output voltage, and the secondary transformer coil may transmit the secondary output voltage to the first direct-current conversion circuit connected thereto. The first direct-current conversion circuit may intermittently apply, based on the predetermined demand voltage of the electric load through an on-off control performed on an electric appliance device in the first direct-current conversion circuit, the secondary output voltage to the electric load, to adjust the secondary output voltage to the target voltage, and to provide the target voltage to the electric load.

In an embodiment of the present disclosure, the power supply may be a direct-current pulse power supply generator, or a direct-current pulse voltage signal obtained by rectifying, filtering, and modulating an alternating current power supply may serve as the power supply.

In an embodiment of the present disclosure, the predetermined demand voltage is a voltage required by the electric load; and the target voltage is a voltage obtained by adjusting the secondary output voltage through the power supply conversion circuit.

In an embodiment of the present disclosure, the first direct-current conversion circuit may provide, based on a requirement of the electric load, the target voltage higher than or lower than the secondary output voltage, or provide the target voltage lower than the secondary output voltage. Alternatively, with the real-time change of the predetermined demand voltage of the electric load, the first direct-current conversion circuit may provide the target voltage sometimes higher or sometimes lower than the secondary output voltage.

In some embodiments, a communication chip may further be provided between the first direct-current conversion circuit and the electric load. The communication chip may be configured to feed the predetermined demand voltage of the electric load back to the first direct-current conversion circuit in real time, thereby allowing the first direct-current conversion circuit to perform, based on the predetermined demand voltage of the electric load, an adjustment to obtain the target voltage.

It should be understood that, in the embodiments of the present disclosure, the transformer secondary side may directly interact, via the first direct-current conversion circuit, with the electric load; and based on the predetermined demand voltage of the electric load, the secondary output voltage of the secondary transformer coil can be adjusted to the target voltage, without feeding the predetermined demand voltage via a feedback circuit back to the transformer primary side for an adjustment by the transformer primary side, thereby improving efficiency of a power supply conversion.

Figure 5:
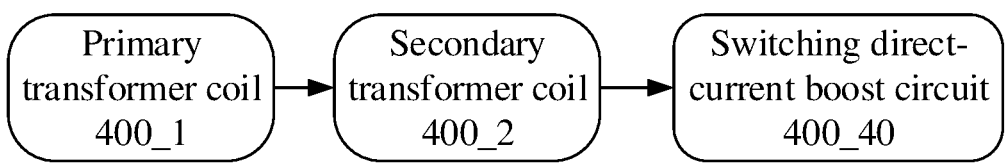
FIG. 5 is a second structural schematic diagram of a power supply conversion circuit according to an embodiment of the present disclosure.

In some embodiments of the present disclosure, based on FIG. 4, the first direct-current conversion circuit 400_3 may be a switching direct-current boost circuit 400_40, as illustrated in FIG. 5. The switching direct-current boost circuit 400_40 is configured to boost, based on the predetermined demand voltage of the electric load through an on-off control performed on the switching direct-current boost circuit 400_40, the secondary output voltage to obtain the target voltage.

In an embodiment of the present disclosure, when the predetermined demand voltage of the electric load is higher than the secondary output voltage outputted by the transformer, the switching direct-current boost circuit may be used as the first direct-current conversion circuit to raise the secondary output voltage to the target voltage.

In an embodiment of the present disclosure, the switching direct-current boost circuit includes at least one of a BOOST circuit, a BUCK/BOOST circuit, a charge pump circuit, or a CUK circuit.

Figure 6:
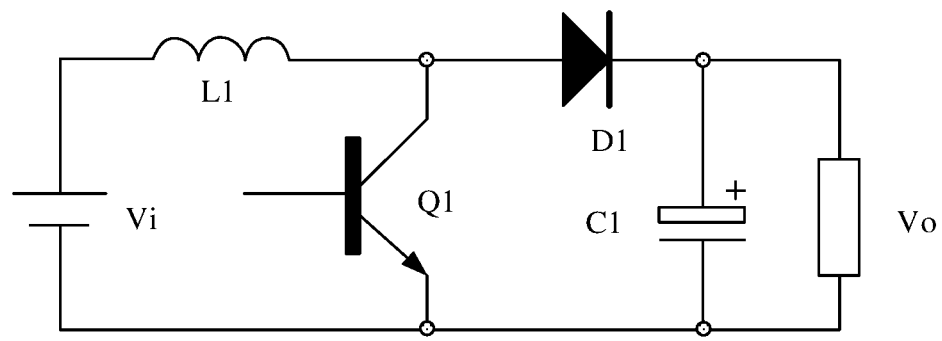
FIG. 6 is a structural schematic diagram of a switching direct-current boost circuit according to an embodiment of the present disclosure.

In some embodiments of the present disclosure, based on FIG. 5, the switching direct-current boost circuit 400_40 may include a first inductor L1, a first switch Q1, a first diode D1, and a first capacitor C1, as illustrated in FIG. 6. In FIG. 6, Vi represents the secondary output voltage outputted between a first terminal and a second terminal of the secondary transformer coil. A first charge loop is formed by connecting a first terminal of the secondary transformer coil to a first end of the first inductor L1, connecting a second end of the first inductor L1 to a first end of the first switch Q1, and connecting and grounding a second end of the first switch Q1 and a second terminal of the secondary transformer coil. A first discharge loop is formed by connecting the second end of the first inductor L1 to an anode of the first diode D1, connecting a cathode of the first diode D1 to a positive electrode of the first capacitor C1, and connecting and grounding a negative electrode of the first capacitor C1 and the second end of the first switch Q1.

In an embodiment of the present disclosure, the first switch Q1 is configured to switch on the first charge loop based on a first predetermined control signal, or switch on the first discharge loop based on a second predetermined control signal. When a pulse signal control circuit connected to the first switch Q1 outputs the first predetermined control signal, for example, when a high-level signal is outputted, the first switch Q1 is switched on to switch on a current loop, which starts from the first terminal of the secondary transformer coil, via the first inductor L1 and the first switch Q1, to the second terminal of the secondary transformer coil, thereby forming the first charge loop for charging the first inductor L1. When the pulse signal control circuit connected to the first switch Q1 outputs the second predetermined control signal, for example, when a low-level signal is outputted, the first switch Q1 is switched off; and the first inductor L1 starts to charge the first capacitor C1 through the first diode D1, thereby forming the first discharge loop. In this way, voltages at both ends of the first capacitor are boosted, and when Vo is higher than Vi, a voltage boosting process can be completed. Therefore, Vo can be higher than the secondary output voltage Vi by constantly repeating the switching on or off of the first switch Q1.

It should be noted that, when the first switch Q1 is switched on, the output voltage Vo of the switching direct-current boost circuit is provided by the first capacitor C1, to supply power to the electric load.

In an embodiment of the present disclosure, the first inductor L1 is configured to store, when the first charge loop is switched on, energy through an output current of the secondary transformer coil; or the first inductor L1 is configured to allow, when the first discharge loop is switched on, the first capacitor C1 to discharge.

In an embodiment of the present disclosure, the first diode D1 is configured to isolate, when the first charge loop is switched on, the first capacitor C1 from discharging to the ground.

In an embodiment of the present disclosure, the first capacitor C1 and the electricity load are connected in parallel. The first capacitor C1 is configured to: store, when the first discharge loop is switched on, power through the secondary transformer coil and the first inductor L1 simultaneously, allowing an output voltage Vo at each of both ends of the first capacitor C1 to be higher than the secondary output voltage Vi of the secondary transformer coil; and provide the output voltage Vo at each of both ends of the first capacitor C1 to the electric load as the target voltage It should be understood that, when the first direct-current conversion circuit is the switching direct-current boost circuit, the output voltage of the switching direct-current boost circuit can be higher than the secondary output voltage of the secondary transformer coil by switching on or off of the first switch. In addition, by controlling a duty ratio of the switching on-off of the first switch, a boosting amplitude of the output voltage of the switching direct-current boost circuit can be controlled to meet the electric load's continuously changing power requirements, without feeding the target voltage desired by the electric load back to the primary transformer coil for voltage conversion control on the primary side. Therefore, a voltage conversion can be directly performed on the transformer secondary side, and thus the efficiency of the power supply conversion can be improved.

Figure 7:
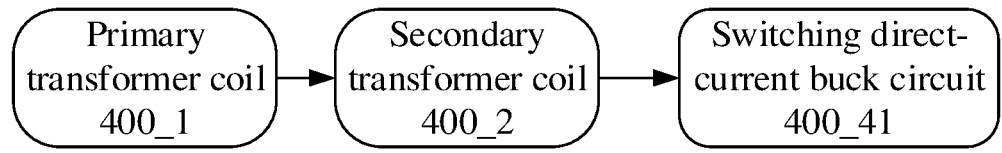
FIG. 7 is a third structural schematic diagram of a power supply conversion circuit according to an embodiment of the present disclosure.

In some embodiments of the present disclosure, based on FIG. 4, the first direct-current conversion circuit 400_3 may be a switching direct-current buck circuit 400_41, as illustrated in FIG. 7. The switching direct-current buck circuit 400_41 is configured to reduce, based on the predetermined demand voltage of the electric load through an on-off control performed on the switching direct-current buck circuit 400_41, the secondary output voltage to obtain the target voltage.

In an embodiment of the present disclosure, when the predetermined demand voltage of the electric load is lower than the secondary output voltage outputted by the transformer, the switching direct-current buck circuit may be used as the first direct-current conversion circuit to reduce the secondary output voltage to the target voltage.

In an embodiment of the present disclosure, the switching direct-current buck circuit may include at least one of a BUCK circuit, a BUCK/BOOST circuit, a charge pump circuit, or a CUK circuit.

Figure 8:
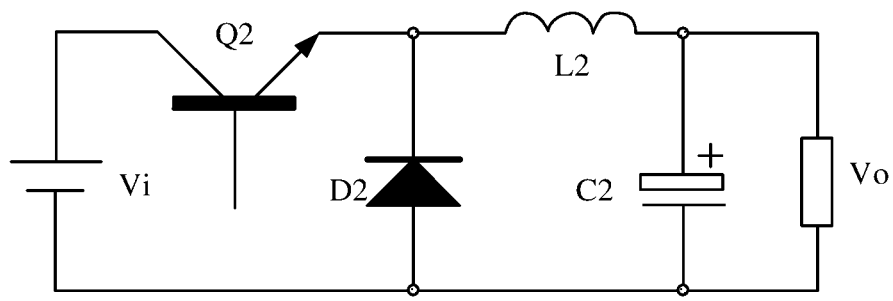
FIG. 8 is a structural schematic diagram of a switching direct-current buck circuit according to an embodiment of the present disclosure.

In some embodiments of the present disclosure, based on FIG. 7, the switching direct-current buck circuit 400_41 may include a second switch Q2, a second diode D2, a second inductor L2, and a second capacitor C2, as illustrated in FIG. 8. In FIG. 8, Vi represents the secondary output voltage outputted between the first and second terminals of the secondary transformer coil. A second charge loop is formed by connecting a first terminal of the secondary transformer coil to a first end of the second switch Q2, connecting a second end of the second switch Q2 to a first end of the second inductor L2, connecting a second end of the second inductor L2 to a positive electrode of the second capacitor C2, and connecting a negative electrode of the second capacitor C2 to a second terminal of the secondary transformer coil and grounding the negative electrode of the second capacitor C2. A second discharge loop is formed by connecting the first end of the second inductor L2 to a cathode of the second diode D2, and simultaneously connecting and grounding an anode of the second diode D2, the second terminal of the secondary transformer coil, and the negative electrode of the second capacitor C2.

Figure 10:
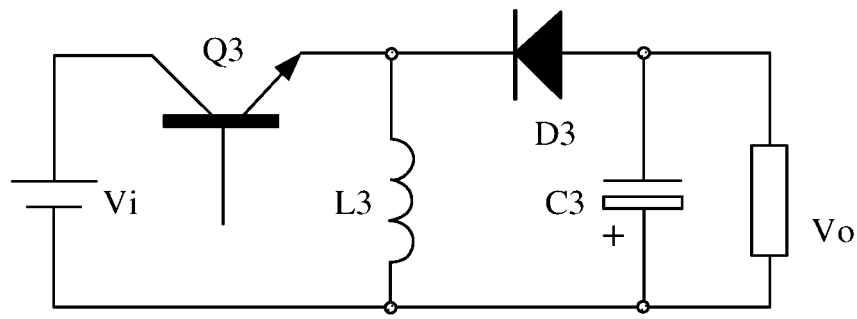
FIG. 10 is a structural schematic diagram of a switching direct-current boost-buck circuit according to an embodiment of the present disclosure.

In an embodiment of the present disclosure, as illustrated in FIG. 10, the second switch Q2 is configured to switch on the second charge loop based on a first predetermined control signal, or switch on the second discharge loop based on a second predetermined control signal. When a pulse signal control circuit connected to the second switch Q2 outputs the first predetermined control signal, for example, when a high-level signal is outputted, the second switch Q2 is switched on. Thus, the output current of the secondary transformer coil flows from the first terminal of the secondary transformer coil to the second terminal of the secondary transformer coil via the second switch Q2, the second inductor L2, and the second capacitor C2, to charge the second inductor L2 and the capacitor C2 simultaneously, thereby forming the second charge loop. In this case, the first terminal of the second inductor L2 is a positive electrode and the second terminal of the second inductor L2 is a negative electrode. When the pulse signal control circuit connected to the second switch Q2 outputs the second predetermined control signal, for example, when a low-level signal is outputted, the second switch Q2 is switched off, and the second inductor L2 can discharge via the second diode D2. In this case, the second terminal of the second inductor L2 is a positive electrode and the first terminal of the second inductor L2 is a negative electrode. During the discharge process, a current of the second inductor L2 is linearly reduced, and the output voltage Vo is maintained by discharge of the second capacitor C2 and the reduced discharge current of the second inductor L2. In this way, Vo can be reduced to be lower than the output voltage Vi of the secondary transformer coil, and thus a voltage buck process can be completed. Therefore, Vo may be lower than the secondary output voltage Vi by constantly repeating the switching on or off of the second switch Q2.

In an embodiment of the present disclosure, the second inductor L2 is configured to store, when the second charge loop is switched on, energy through an output current of the secondary transformer coil; or the second inductor L2 is configured to allow, when the second discharge loop is switched on, the second capacitor to discharge.

In an embodiment of the present disclosure, the second diode D2 is configured to isolate, when the second charge loop is switched on, the secondary transformer coil from discharging to the ground.

In an embodiment of the present disclosure, the second capacitor C2 and the electric load are connected in parallel. In addition, the second capacitor C2 is configured to discharge, when the second discharge loop is switched on, simultaneously with the second inductor L2, allowing an output voltage Vo at each of both ends of the second capacitor C2 to be lower than the secondary output voltage Vi of the secondary transformer coil; and provide the output voltage Vo at each of both ends of the second capacitor to the electric load as the target voltage.

It should be understood that, when the first direct-current conversion circuit is the switching direct-current buck circuit, the output voltage of the switching direct-current buck circuit can be lower than the secondary output voltage of the secondary transformer coil by switching on or off of the second switch. In addition, by controlling a duty ratio of the switching on-off of the second switch, a reduced amplitude of the output voltage of the switching direct-current boost circuit can be controlled to meet the electric load's continuously changing power requirements, without feeding the target voltage desired by the electric load back to the primary transformer coil for voltage conversion control on the primary side. Therefore, a voltage conversion can be directly performed on the transformer secondary side, and thus the efficiency of the power supply conversion can be improved.

Figure 9:
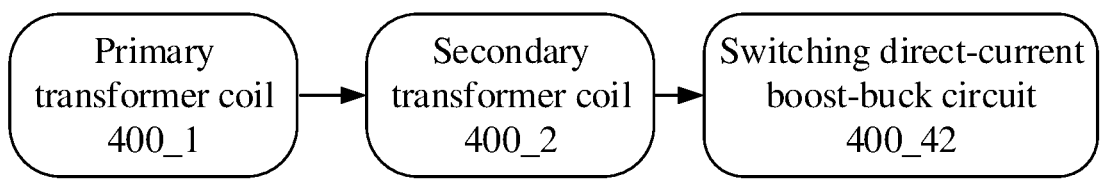
FIG. 9 is a fourth structural schematic diagram of a power supply conversion circuit according to an embodiment of the present disclosure.

In some embodiments of the present disclosure, based on FIG. 4, the first direct-current conversion circuit 400_3 may also be a switching direct-current boost-buck circuit 400_42, as illustrated in FIG. 9. The switching direct-current boost-buck circuit 400_42 is configured to boost or reduce, based on the predetermined demand voltage of the electric load through an on-off control performed on the switching direct-current boost-buck circuit 400_42, the secondary output voltage to obtain the target voltage.

In an embodiment of the present disclosure, the predetermined demand voltage of the electric load in operation may vary to a higher level or to a lower level. The predetermined demand voltage of the electric load may sometimes need to be higher than the secondary output voltage outputted by the transformer, or sometimes lower than the secondary output voltage outputted by the transformer. In this case, the switching direct-current boost-buck circuit may be used as the first direct-current conversion circuit to boost or reduce, based on a requirement of the electric load, the secondary output voltage to the target voltage.

In some embodiments, the switching direct-current buck circuit may be a BUCK/BOOST circuit.

In an embodiment of the present disclosure, based on FIG. 9, the switching direct-current boost-buck circuit 400_42 may include a third switch Q3, a third inductor L3, a third diode D3, and a third capacitor C3, as illustrated in FIG. 10. In FIG. 10, Vi represents the secondary output voltage outputted between the first terminal and the second terminal of the secondary transformer coil. A third charge loop is formed by connecting a first terminal of the secondary transformer coil to a first end of the third switch Q3, connecting a second end of the third switch Q3 to a first end of the third inductor L3, and connecting a second end of the third inductor L3 to a second terminal of the secondary transformer coil. A third discharge loop is formed by connecting the first end of the third inductor L3 to a cathode of the third diode D3, connecting the second end of the third inductor L3 to a positive electrode of the third capacitor C3, and connecting a negative electrode of the third capacitor C3 to an anode of the third diode D3. The third inductor L3, the third capacitor C3, and the electric load are connected in parallel.

In an embodiment of the present disclosure, as illustrated in FIG. 10, the third switch Q3 is configured to switch on the third charge loop based on a first predetermined control signal, or switch on the third discharge loop based on a second predetermined control signal. When a pulse signal control circuit connected to the third switch Q3 outputs the first predetermined control signal, for example, when a high-level signal is outputted, the third switch Q3 is switch on, the third diode D3 is reverse biased and cut off, and the secondary transformer coil charges the third inductor L3. In this case, the first terminal of the third inductor L3 is a positive electrode and the second terminal of the third inductor L3 is a negative electrode. Therefore, the third charge loop is formed. In this case, the third capacitor C3 outputs the voltage Vo to the electric load. With an increase in a duration of the first predetermined control signal, an induced electromotive force accumulated on the third inductor L3 becomes greater. When the pulse signal control circuit connected to the third switch Q3 outputs the second predetermined control signal, for example, when a low-level signal is outputted, the third switch Q3 is switched off. In this case, when the induced electromotive force on the third inductor L3 exceeds a voltage on the third capacitor C3, the third diode D3 is switched on. The second terminal of the third inductor L3 is a positive electrode and the first terminal of the third inductor L3 is a negative electrode. The third inductor L3 supplies power to the electric load through the third diode D3 and the third capacitor C3 simultaneously, allowing the output voltage Vo to be higher than the secondary output voltage Vi, and thus a voltage boosting process of the secondary output voltage Vi can be completed. When the induced electromotive force on the third inductor L3 does not exceed the voltage on the third capacitor C3, the third diode D3 is cut off, and the third capacitor C3 supplies power to the electric load alone. In this case, the output voltage obtained by the electric load is lower than the secondary output voltage Vi, and thus a voltage buck process of the secondary output voltage Vi can be completed. Therefore, the secondary output voltage Vi can be boosted or lowered by adjusting a duty ratio of switching on-off time of the third switch Q3.

In an embodiment of the present disclosure, the third inductor L3 is configured to store, when the third charge loop is switched on, energy through an output current of the secondary transformer coil; or the third inductor L3 is configured to discharge, when the third discharge loop is switched on, to the electric load simultaneously with the third capacitor.

In an embodiment of the present disclosure, the third diode D3 is configured to isolate, when the third discharge loop is switched on, the third inductor from discharging to the third capacitor.

In an embodiment of the present disclosure, the third capacitor C3 is configured to supply, when the third discharge loop is switched on and when an induced electromotive force on the third inductor is higher than an output voltage across two ends of the third capacitor, power to the electric load simultaneously with the third inductor, allowing the output voltage across two ends of the third capacitor to be higher than the secondary output voltage of the secondary transformer coil, providing the output voltage to the electric load as the target voltage.

In an embodiment of the present disclosure, the third capacitor C3 is further configured to supply, when the third discharge loop is switched on and when the induced electromotive force on the third inductor is lower than the output voltage across two ends of the third capacitor, power to the electric load, allowing the output voltage across two ends of the third capacitor to lower than the secondary output voltage of the secondary transformer coil, providing the output voltage to the electric load as the target voltage.

It should be noted that, in an embodiment of the present disclosure, the output voltage of the switching direct-current boost-buck circuit is of opposite polarity to the secondary output voltage.

It should be understood that, when the first direct-current conversion circuit is the switching direct-current boost-buck circuit, the output voltage of the switching direct-current buck circuit can be lower than the secondary output voltage of the secondary transformer coil by switching on or off the third switch. In addition, by controlling a duty ratio of the on-off of the third switch, a reduced amplitude of the output voltage of the switching direct-current boost circuit can be controlled to meet the electric load's continuously changing power requirements, without feeding the target voltage desired by the electric load back to the primary transformer coil for voltage conversion control on the primary side. Therefore, the voltage conversion can be directly performed on the transformer secondary side, and thus the efficiency of the power supply conversion can be improved.

It should be noted that each of the first switch, the second switch, and the third switch may be a triode, a Metal-Oxide-Semiconductor Field-Effect Transistor (MOSFET), or any other member that can be controlled to be switched on or off. The embodiments of the present disclosure are not limited to any of these examples.

In addition, a voltage of an MOSFET when being switched on is smaller than a voltage of a diode when being switched on, the first diode, the second diode, and the third diode may be replaced by the MOSFET. In this way, power loss can be reduced to enhance the conversion efficiency of the direct-current conversion circuit.

It should be noted that, in FIG. 6, FIG. 8, and FIG. 10, a pulse signal generation circuit may be connected to a third end of each of the first switch, the second switch, and the third switch. The pulse signal generation circuit is configured to generate the first predetermined control signal or the second predetermined control signal and adjust a duty ratio of the first predetermined control signal and the second predetermined control signal. Here, by adjusting a duty ratio of a pulse signal, a magnitude of a change of the direct-current conversion circuit can be controlled over an initial voltage. Therefore, for different secondary output voltages, different magnitudes can be varied to adjust different secondary output voltages to the target voltage.

Figure 11:
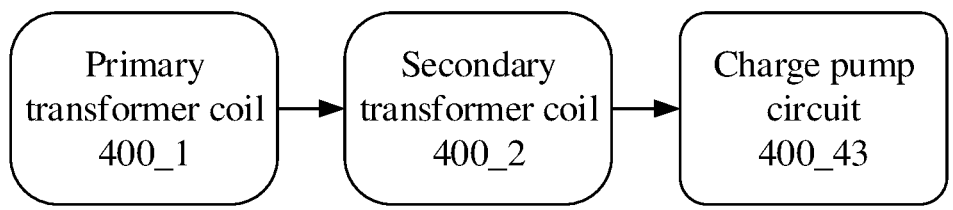
FIG. 11 is a fifth structural schematic diagram of a power supply conversion circuit according to an embodiment of the present disclosure.

In an embodiment of the present disclosure, based on the power supply conversion circuit illustrated in FIG. 9, the switching direct-current boost-buck circuit 400_42 may be a charge pump circuit 400_43, as illustrated in FIG. 11. The charge pump circuit 400_43 is configured to boost or reduce, based on the predetermined demand voltage of the electric load through an on-off control performed on the charge pump circuit, the secondary output voltage to obtain the target voltage.

In an embodiment of the present disclosure, the charge pump circuit may be a switchable regulator boost pump, an unadjustable capacitor charge pump, an adjustable capacitor charge pump, or other forms of charge pump circuit, and it may be selected as desired, which is not limited in the present disclosure.

In an embodiment of the present disclosure, based on the power supply conversion circuit illustrated in FIG. 4, multi-stage direct-current conversion circuits may be added following the first direct-current conversion circuit, depending on the requirement of the electric load. For example, when the secondary output voltage needs to be increased to the target voltage, the initial voltage may be boosted, via a first-stage direct-current conversion circuit, to an intermediate voltage, which may serve as an input voltage for a next-stage direct-current conversion circuit. The intermediate voltage is finally converted into the target voltage via the next-stage direct-current conversion circuit.

For example, the target voltage is 260 V. When the secondary output voltage is 215 V, the first-stage switching direct-current boost circuit may increase the voltage from 215 V to a voltage of 230 V, and the voltage of 230 V outputted by the switching direct-current boost circuit may be increased to a voltage of 260 V by a first-stage charge pump circuit. Here, the multi-stage direct-current conversion circuits may be combined, as desired, in any number and form of switching direct-current boost circuits, switching direct-current buck circuits, and switching direct-current boost-buck circuits. The number and form are not limited in the embodiments of the present disclosure.

Figure 14:
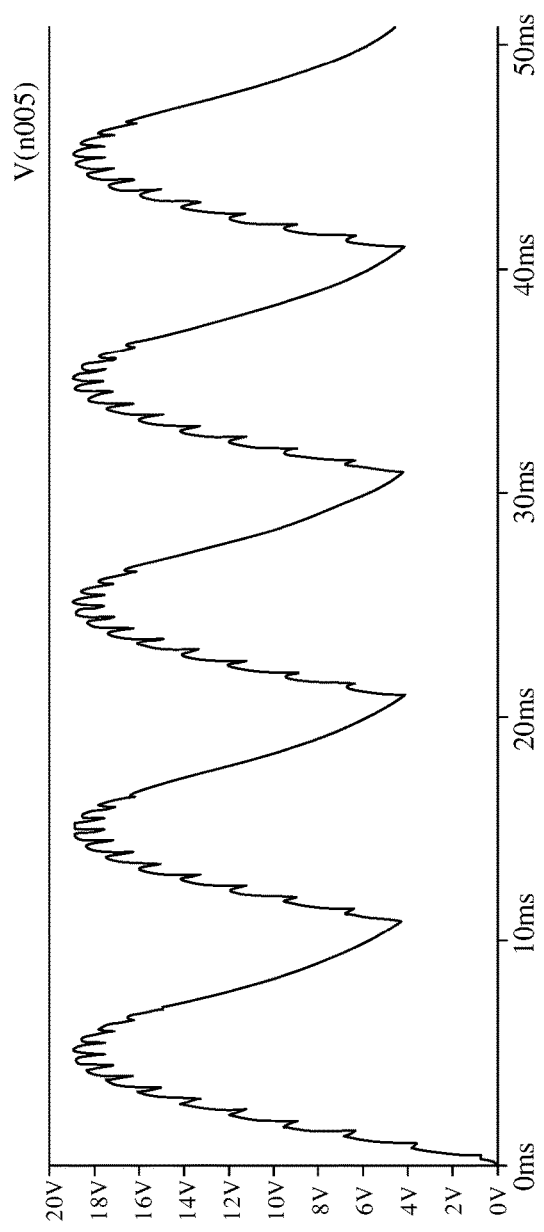
FIG. 14 is a second waveform diagram of an electrical signal according to an embodiment of the present disclosure.

In some embodiments of the present disclosure, based on FIG. 4, when the output end of the power supply outputs an alternating current, the power supply in the power supply conversion circuit may include the rectifier circuit and the pulse width modulation circuit, as illustrated in FIG. 14. The rectifier circuit and the pulse width modulation circuit are configured to convert an alternating current to a direct current, when the output end of the power supply outputs the alternating current.

In some embodiments of the present disclosure, based on the power supply conversion circuit illustrated in any one of FIG. 4, FIG. 5, FIG. 7, and FIG. 9, the power supply conversion circuit may further include a first filter capacitor connected in parallel between two ends of the secondary transformer coil and the first direct-current conversion circuit. The first filter capacitor is configured to boost the secondary output voltage to prevent the secondary output voltage from being lower than a minimum operating voltage of the first direct-current conversion circuit.

In an embodiment of the present disclosure, since the secondary output voltage generated by the secondary transformer coil is usually low in frequency and an input voltage at a lowest point may be almost 0 V, it is necessary to add the first filter capacitor between the secondary transformer coil and the direct-current conversion circuit to prevent the input voltage obtained by the first direct-current conversion circuit from dropping too low, thereby ensuring to maintain the first direct-current conversion circuit in an operating condition.

In an embodiment of the present disclosure, the first filter capacitor may be a variable capacitor or a trimmer capacitor in addition to a fixed capacitor. In this way, a magnitude of a first input capacitance may be adjusted based on loads to achieve an optimal filtering and boosting effect. A specific capacitor structure may be set as desired, and is not limited in the embodiment of the present disclosure.

In an embodiment of the present disclosure, a capacitance value of the first filter capacitor is adjusted mainly based on a magnitude of a final electric load, which is not limited in the embodiments of the present disclosure. In some embodiments, an input capacitance of 100 uF may effectively support an operation of the first direct-current conversion circuit at a peak output of 120 W load power.

In an embodiment of the present disclosure, when the initial voltage is an alternating current voltage provided by an alternating current power supply, the power supply conversion circuit further includes a rectifier-filter circuit connected between the alternating current power supply and the primary transformer coil. The rectifier-filter circuit is configured to convert an alternating current into a direct current, when the output end of the power supply outputs the alternating current.

In an embodiment of the present disclosure, a pulse width modulation circuit may be connected between the rectifier-filter circuit and the primary transformer coil, and the pulse width modulation circuit may be configured to generate, based on a current signal outputted by the rectifier-filter circuit, a pulse square wave and apply the pulse square wave to the primary transformer coil.

Figure 12:
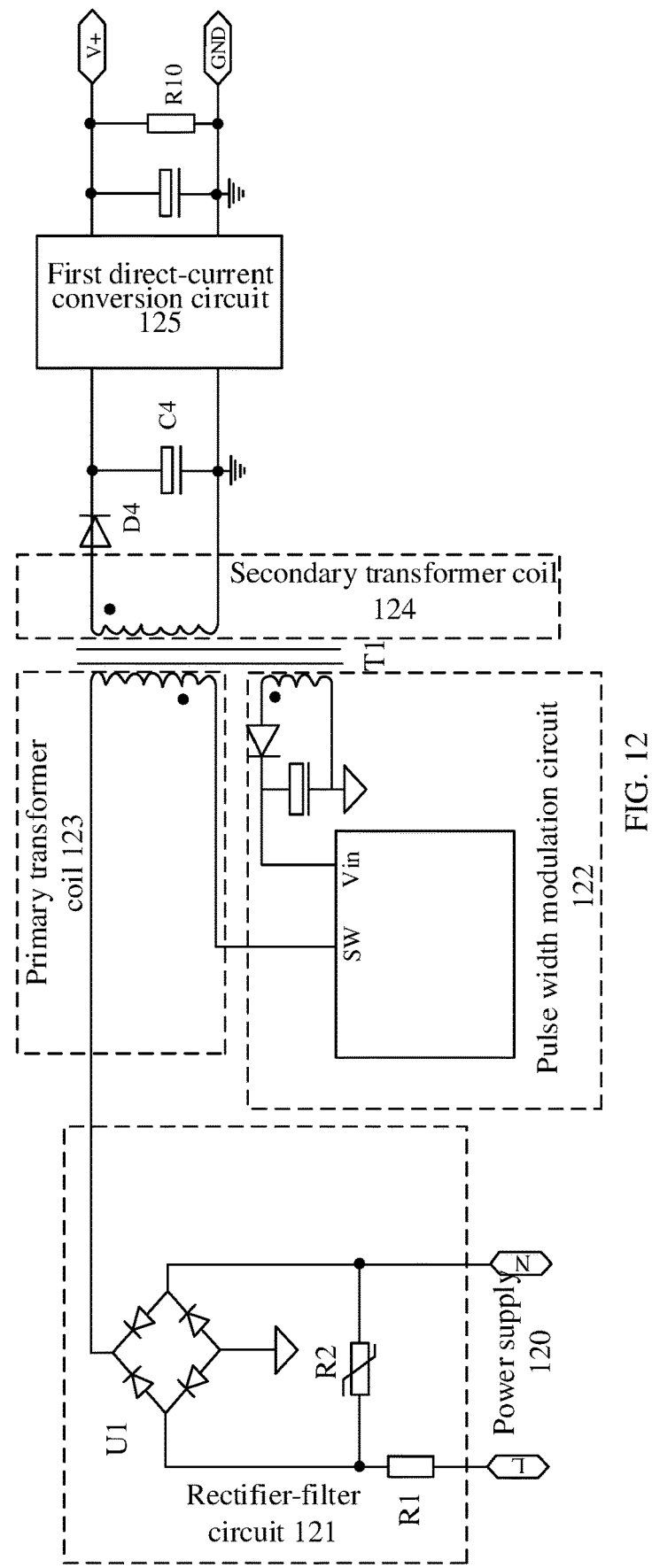
FIG. 12 is a sixth structural schematic diagram of a power supply conversion circuit according to an embodiment of the present disclosure.

In some embodiments, based on FIG. 4, the power supply conversion circuit including the first filter capacitor may be as illustrated in FIG. 12. In FIG. 12, a power supply 120 includes an electrode L and an electrode N, configured to output an alternating-current sine-wave electrical signal. A rectifier-filter circuit 121 and a pulse width modulation circuit 122 are connected between the power supply 120 and a primary transformer coil 123. The rectifier-filter circuit 121 is configured to convert the alternating current signal into a direct current. The pulse width modulation circuit 122 is configured to generate, based on a current signal outputted by the rectifier-filter circuit, a pulse square wave and apply the pulse square wave to the primary transformer coil 123 of a transformer T1. A first filter capacitor C4 is connected in parallel between two ends of a secondary transformer coil 124 and a first direct-current conversion circuit 125, and configured to boost the secondary output voltage to prevent the secondary output voltage from being lower than a minimum operating voltage of the first direct-current conversion circuit 125.

Here, the rectifier-filter circuit 121 may be a half-wave rectifier circuit, a full-wave rectifier circuit, a bridge rectifier circuit, a voltage multiplier rectifier circuit, or other types of rectifier circuits. The filter circuit may be a passive filter circuit or an active filter circuit. Specific type of the rectifier-filter circuit 121 and the filter circuit may be selected as desired, and are not specifically limited in the embodiment of the present disclosure.

In some embodiments, as illustrated in FIG. 12, a filter diode D4 may further be connected in series between a positive electrode of the first filter capacitor C4 and a positive electrode of the secondary transformer coil, to filter a power signal outputted from the secondary transformer coil.

Figure 13:
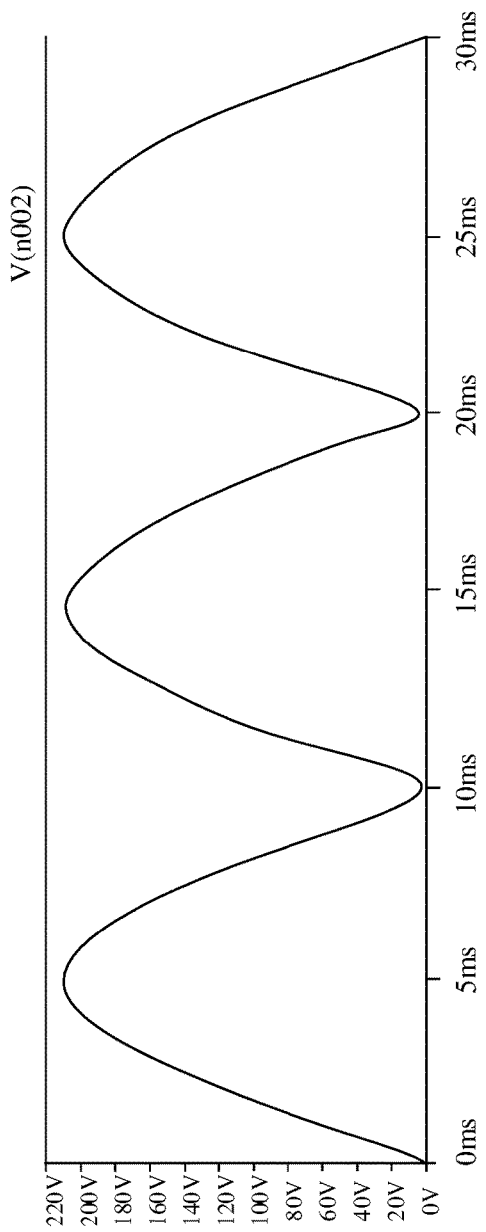
FIG. 13 is a first waveform diagram of an electrical signal according to an embodiment of the present disclosure.

In some embodiments, based on FIG. 12, after the alternating current signal provided by the power supply 120 flows through the rectifier-filter circuit 121, a waveform of the alternating current signal may be as illustrated in FIG. 13; and after the alternating-current sine-wave electrical signal inputted by the power supply 120 passes through the rectifier-filter circuit 121, a waveform of the alternating-current sine-wave electrical signal becomes a bun-shaped waveform as illustrated in FIG. 13.

In some embodiments, based on FIG. 13, the waveform of the electrical signal through the first filter capacitor C4 may be as illustrated in FIG. 14. Since the input voltage of the first direct-current conversion circuit is effectively boosted by the first filter capacitor, a minimum voltage inputted to the first direct-current conversion circuit is greater than 0V, about 4V, as illustrated in FIG. 14, in order to satisfy the minimum operating voltage required by most of the switching direct-current boost circuits, switching direct-current buck circuits, switching direct-current boost-buck circuits, and other circuits.

Figure 15:
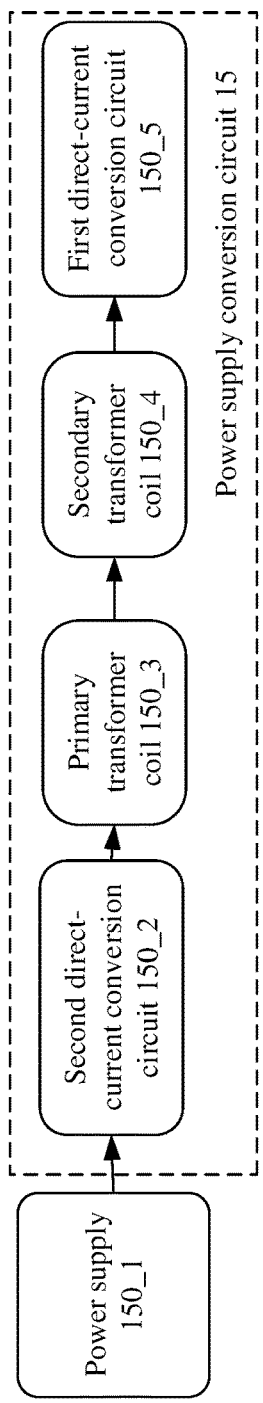
FIG. 15 is a seventh structural schematic diagram of a power supply conversion circuit according to an embodiment of the present disclosure.

In an embodiment of the present disclosure, based on an illustration of any one of FIG. 4, FIG. 5, FIG. 7, FIG. 9, FIG. 11, or FIG. 12, the power supply conversion circuit may be as illustrated in FIG. 15. Here, the initial voltage is provided by the power supply 150_1. The power supply conversion circuit 15 includes a second direct-current conversion circuit 150_2 having an input end connected to an output end of the power supply 150_1, and an output end connected to the primary transformer coil 150_3.

In the embodiment of the present disclosure, the second direct-current conversion circuit is configured to adjust, based on a predetermined operating voltage of the primary transformer coil, the initial voltage to obtain a target operating voltage of the primary transformer coil.

In the embodiment of the present disclosure, the second direct-current conversion circuit may also be a switching direct-current boost circuit, a switching direct-current buck circuit, a switching direct-current boost-buck circuit, having the similar circuit structure and boost/buck principles as those of the first direct-current conversion circuit, which are not described in detail herein.

It should be understood that, in the embodiments of the present disclosure, the second direct-current conversion circuit may boost the input voltage on the transformer primary side, to effectively reduce or eliminate a dead zone of an operation of the transformer. Therefore, both the power supply conversion circuit and the transformer primary side can be provided with a sufficient voltage at any time, thereby guaranteeing a normal operation of the electric load.

In an embodiment of the present disclosure, the power supply conversion circuit may include a second filter capacitor in a parallel connection with the second direct-current conversion circuit, and the second filter capacitor is configured to boost the initial voltage to prevent the initial voltage from being lower than a minimum operating voltage of the second direct-current conversion circuit, thereby effectively supporting the operation of the second direct-current conversion circuit.

In an embodiment of the present disclosure, a capacitance value of the second filter capacitor is adjusted mainly based on the target operating voltage of the primary transformer coil. The capacitance value of the second filter capacitor is not limited in the embodiments of the present disclosure.

Figure 16:
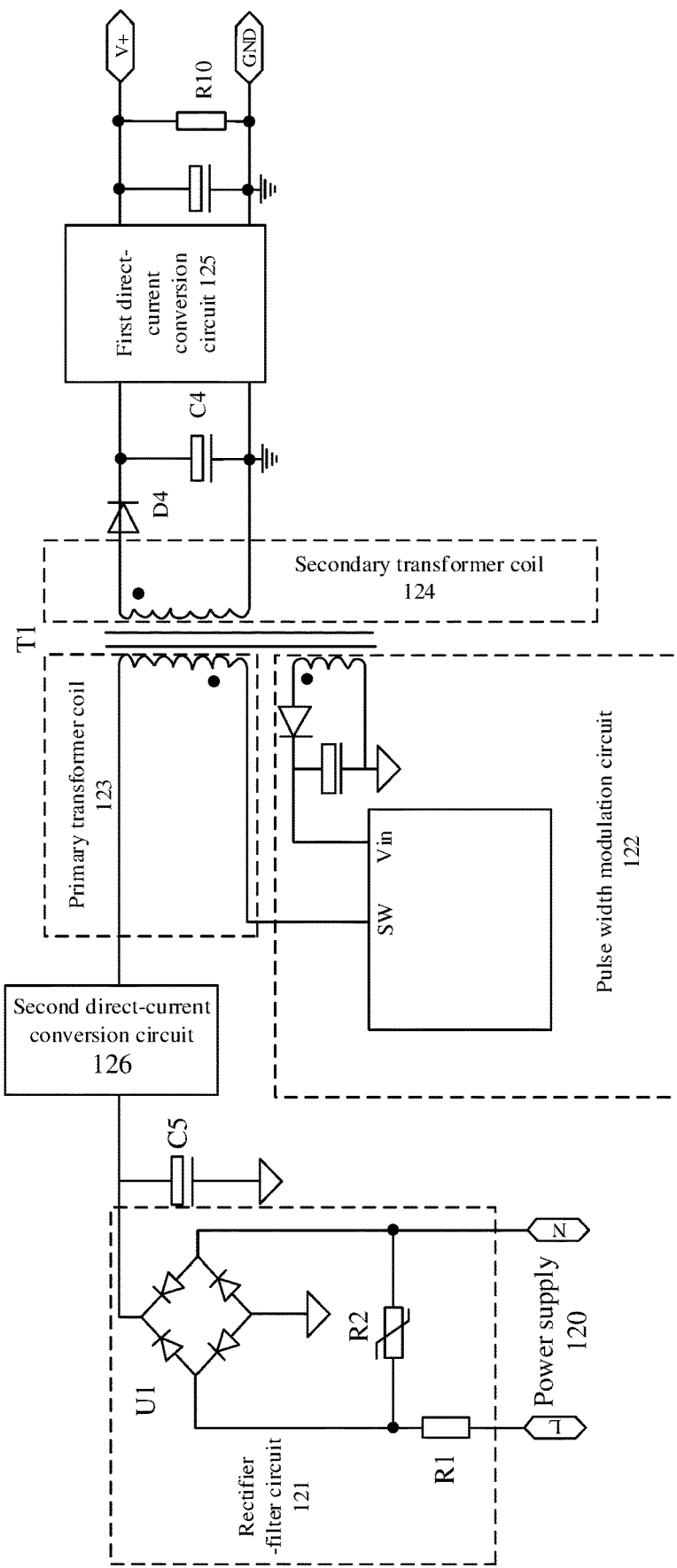
FIG. 16 is an eighth structural schematic diagram of a power supply conversion circuit according to an embodiment of the present disclosure.

In some embodiments, based on FIG. 12, the power supply conversion circuit including the second filter capacitor may be as illustrated in FIG. 16. In FIG. 16, C5 represents the second filter capacitor, and C5 is connected in parallel with a second direct-current conversion circuit 126.

Figure 17:
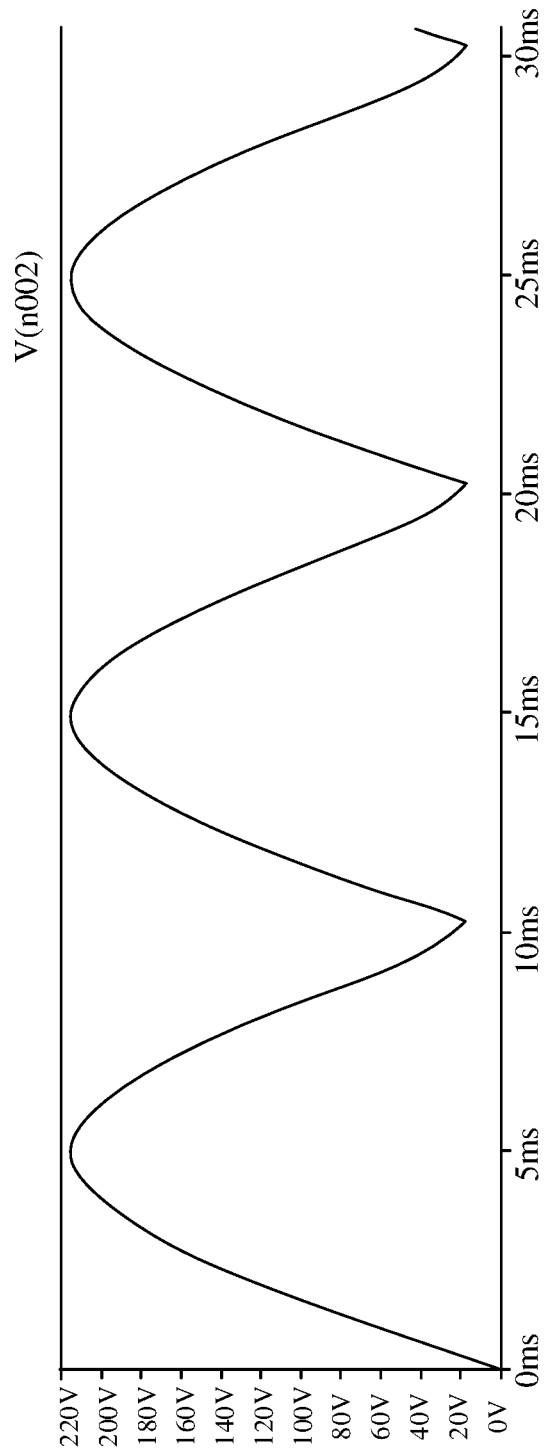
FIG. 17 is a third waveform diagram of an electrical signal according to an embodiment of the present disclosure.

In some embodiments, based on FIG. 14 and FIG. 16, an electrical signal outputted by the first filter capacitor C5, after being converted by the transformer and stepped up by the second filter capacitor C4, has a waveform as illustrated in FIG. 17.

It should be understood that, in an embodiment of the present disclosure, the second filter capacitor can ensure that the input voltage of the second direct-current conversion circuit always meets the minimum operating voltage required by the second direct-current conversion circuit, thereby ensuring a normal operation of the entire power supply conversion circuit.

Figure 18:
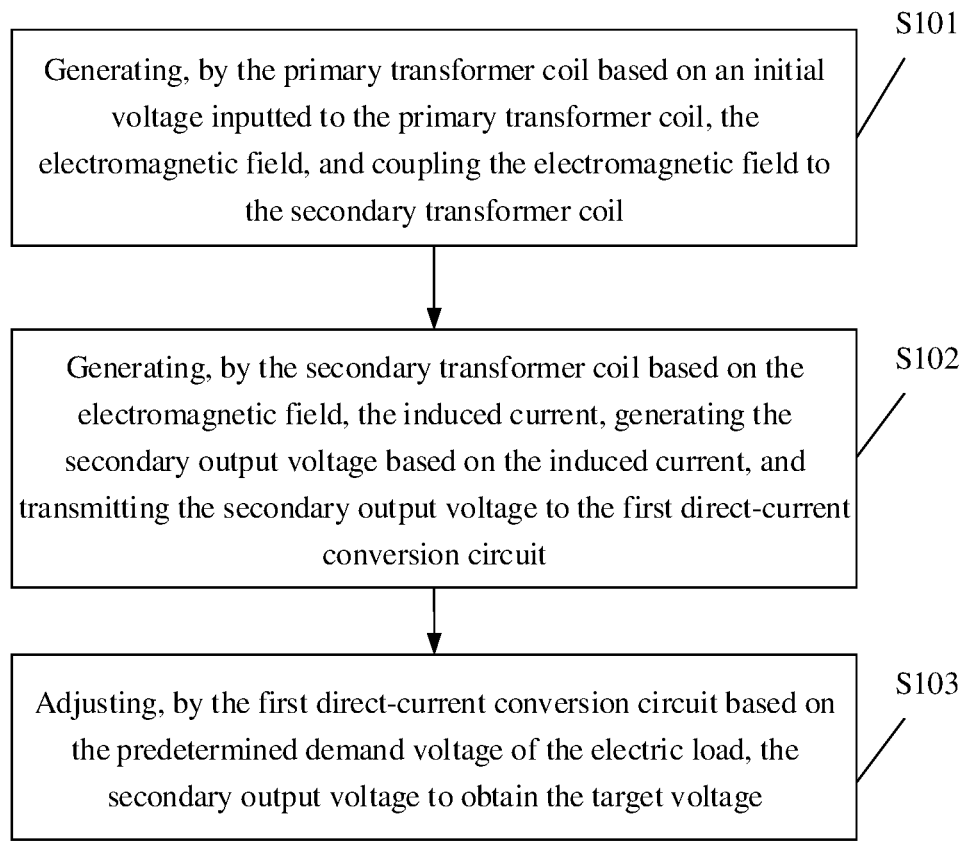
FIG. 18 is a schematic flowchart of a power supply conversion method according to an embodiment of the present disclosure.

According to an embodiment of the present disclosure, a power supply conversion method is provided. The method is applied to the above-mentioned power supply conversion circuit. As illustrated in FIG. 18, the method includes actions in blocks S101 to S103.

At S101, an electromagnetic field is generated by a primary transformer coil based on an initial voltage inputted to the primary transformer coil, and the electromagnetic field is coupled to the secondary transformer coil.

In the embodiment of the present disclosure, the power supply conversion circuit may be configured to generate, by the primary transformer coil of the transformer based on the initial voltage and the initial current that are provided by the output end of the power supply and added to the transformer, the electromagnetic field, and couple, through the electromagnetic field, the electric energy from the primary transformer coil to the secondary transformer coil.

At S102, an induced current is generated by a secondary transformer coil based on the electromagnetic field, a secondary output voltage is generated based on the induced current, and the secondary output voltage is transmitted to the first direct-current conversion circuit.

In the embodiment of the present disclosure, the power supply conversion circuit may be configured to generate, by the secondary transformer coil based on the induced electromagnetic field, the induced current, generate the secondary output voltage based on the induced current, and transmit the secondary output voltage to the first direct-current conversion circuit connected to the secondary transformer coil.

At S103, the secondary output voltage is adjusted by a first direct-current conversion circuit based on a predetermined demand voltage of an electric load, to obtain a target voltage.

In the embodiment of the present disclosure, the power supply conversion circuit may be configured to apply, based on the predetermined demand voltage of the electric load through an on-off control performed on an electric device in the first direct-current conversion circuit, the secondary output voltage to the electric load intermittently, to adjust the secondary output voltage to the target voltage, and provide the target voltage to the electric load.

It can be appreciated that, the transformer secondary side may be configured to directly interact with the electric load via the first direct-current conversion circuit, and adjust, based on the predetermined demand voltage of the electric load, the secondary output voltage to the target voltage, without performing an indirect adjustment by the transformer primary side based on feedback information from the feedback circuit, thereby increasing the efficiency of the power supply conversion.

In some embodiments, the first direct-current conversion circuit may include a switching direct-current boost circuit. The power supply conversion circuit may be configured to boost, based on the predetermined demand voltage of the electric load through an on-off control performed on the switching direct-current boost circuit, the secondary output voltage to obtain the target voltage.

In some embodiments, the first direct-current conversion circuit may include a switching direct-current buck circuit. The power supply conversion circuit may be configured to reduce, based on the predetermined demand voltage of the electric load through an on-off control performed on the switching direct-current buck circuit, the secondary output voltage to obtain the target voltage.

In some embodiments, the first direct-current conversion circuit includes a switching direct-current boost-buck circuit. The power supply conversion circuit may be configured to boost or reduce, based on the predetermined demand voltage of the electric load through an on-off control performed on the switching direct-current boost-buck circuit, the secondary output voltage to obtain the target voltage.

In some embodiments, the switching direct-current boost circuit includes a first inductor, a first switch, a first diode, and a first capacitor. A first charge loop is formed by connecting a first terminal of the secondary transformer coil to a first end of the first inductor, connecting a second end of the first inductor to a first end of the first switch, and connecting and grounding a second end of the first switch and a second terminal of the secondary transformer coil. A first discharge loop is formed by connecting the second end of the first inductor to an anode of the first diode, connecting a cathode of the first diode to a positive electrode of the first capacitor, and connecting and grounding a negative electrode of the first capacitor and the second end of the first switch.

The power supply conversion circuit can switch on the first charge loop by means of the first switch based on a first predetermined control signal, or switch on the first discharge loop by means of the first switch based on a second predetermined control signal. When the first charge loop is switched on, by means of the first inductor, the power supply conversion circuit can store energy through an output current of the secondary transformer coil. When the first discharge loop is switched on, by means of the first inductor, the power supply conversion circuit can allow the first capacitor to discharge. When the first charge loop is switched on, by means of the first diode, the power supply conversion circuit can isolate the first capacitor from discharging to the ground.

Here, the electricity load and the first capacitor are connected in parallel. When the first discharge loop is switched on, the power supply conversion circuit, by means of the first capacitor, can store energy through the secondary transformer coil and the first inductor simultaneously, allowing an output voltage across two ends of the first capacitor to be higher than the secondary output voltage of the secondary transformer coil, and the power supply conversion circuit can provide the output voltage across two ends of the first capacitor, as the target voltage, to the electric load.

In some embodiments, the first direct-current conversion circuit includes the switching direct-current buck circuit including a second switch, a second diode, a second inductor, and a second capacitor. A second charge loop is formed by connecting a first terminal of the secondary transformer coil to a first end of the second switch, connecting a second end of the second switch to a first end of the second inductor, connecting a second end of the second inductor to a positive electrode of the second capacitor, and connecting and grounding a negative electrode of the second capacitor and a second terminal of the secondary transformer coil. A second discharge loop is formed by connecting the first end of the second inductor to a cathode of the second diode, and simultaneously connecting and grounding an anode of the second diode, the second terminal of the secondary transformer coil, and the negative electrode of the second capacitor. The power supply conversion circuit can switch on the second charge loop by means of the second switch based on a first predetermined control signal, or switch on the second discharge loop by means of the second switch based on a second predetermined control signal. When the second charge loop is switched on, the power supply conversion circuit, by means of the second inductor, can store energy through an output current of the secondary transformer coil. When the second discharge loop is switched on, the power supply conversion circuit, by means of the second inductor, can allow the second capacitor to discharge. When the second charge loop is switched on, the power supply conversion circuit, by means of the second diode can isolate the secondary transformer coil from discharging to the ground.

Here, the electric load and the second capacitor are connected in parallel. When the second discharge loop is switched on, the power supply conversion circuit, by means of the second capacitor, can discharge simultaneously with the second inductor, allowing an output voltage across two ends of the second capacitor to be lower than the secondary output voltage of the secondary transformer coil; and the power supply conversion circuit can provide the output voltage across two ends of the second capacitor, as the target voltage, the electric load.

In some embodiments, the first direct-current conversion circuit includes the switching direct-current boost-buck circuit including a third switch, a third inductor, a third diode, and a third capacitor. A third charge loop is formed by connecting a first terminal of the secondary transformer coil to a first end of the third switch, connecting a second end of the third switch to a first end of the third inductor, and connecting a second end of the third inductor to a second terminal of the secondary transformer coil. A third discharge loop is formed by connecting the first end of the third inductor to a cathode of the third diode, connecting the second end of the third inductor to a positive electrode of the third capacitor, and connecting a negative electrode of the third capacitor to an anode of the third diode. The third inductor, the third capacitor, and the electric load are connected in parallel. The power supply conversion circuit can switch on the third charge loop by means of the third switch based on a first predetermined control signal, or switch on the third discharge loop by means of the third switch based on a second predetermined control signal. When the third charge loop is switched on, by means of the third inductor, the power supply conversion circuit can store energy through an output current of the secondary transformer coil. When the third discharge loop is switched on, the power supply conversion circuit can discharge to the electric load by the third inductor and the third capacitor simultaneously. When the third discharge loop is switched on, the power supply conversion circuit can isolate, by means of the third diode, the third inductor from discharging to the third capacitor. When the third discharge loop is switched on and when an induced electromotive force on the third inductor is higher than an output voltage across two ends of the third capacitor, the power supply conversion circuit can supply power to the electric load by means of the third capacitor and the third inductor simultaneously, allowing the output voltage across two ends of the third capacitor to be higher than the secondary output voltage of the secondary transformer coil, providing the output voltage to the electric load as the target voltage. When the third discharge loop is switched on and when the induced electromotive force on the third inductor is lower than the output voltage across two ends of the third capacitor, the power supply conversion circuit can supply power to the electric load by means of the third capacitor, allowing the output voltage across two ends of the third capacitor to be lower than the secondary output voltage of the secondary transformer coil, providing the output voltage to the electric load as the target voltage.

In some embodiments, the power supply conversion circuit further includes a first filter capacitor connected in parallel between two ends of the secondary transformer coil and the first direct-current conversion circuit. The power supply conversion circuit may be configured to boost, by means of the first filter capacitor, the secondary output voltage to prevent the secondary output voltage from being lower than a minimum operating voltage of the first direct-current conversion circuit.

In some embodiments, the initial voltage is provided by a power supply. Here, the power supply conversion circuit further includes a second direct-current conversion circuit having an input end connected to an output end of the power supply and an output end connected to the primary transformer coil. The power supply conversion circuit may be configured to adjust, by means of the second direct-current conversion circuit based on a predetermined operating voltage of the primary transformer coil, the initial voltage, to obtain a target operating voltage of the primary transformer coil.

In some embodiments, the power supply conversion circuit further includes a second filter capacitor in a parallel connection with the second direct-current conversion circuit. The power supply conversion circuit may be configured to raise, by means of the second filter capacitor, the initial voltage to prevent the initial voltage from being lower than a minimum operating voltage of the second direct-current conversion circuit.

In some embodiments, when the initial voltage is an alternating current voltage provided by an alternating current power supply, the power supply conversion circuit further includes a rectifier-filter circuit connected between the alternating current power supply and the primary transformer coil. The power supply conversion circuit may be configured to convert, by means of the rectifier-filter circuit, an alternating current to a direct current.

In some embodiments, a pulse width modulation circuit is connected between the rectifier-filter circuit and the primary transformer coil. The power supply conversion circuit may be configured to generate, by means of the pulse width modulation circuit based on a current signal outputted by the rectifier-filter circuit, a pulse square wave, and apply the pulse square wave to the primary transformer coil.

In some embodiments, the switching direct-current boost circuit may include at least one of a BOOST circuit, a BUCK/BOOST circuit, a charge pump circuit, or a CUK circuit.

In some embodiments, the switching direct-current buck circuit may include at least one of a BUCK circuit, a BUCK/BOOST circuit, a charge pump circuit, or a CUK circuit.

It should be noted that the embodiments of the power supply conversion method are described in a similar manner as the embodiments of the power supply conversion circuit, and they have similar beneficial effects as those of the embodiments on the power supply conversion circuit. For technical details not disclosed in the embodiments of the power supply conversion method provided by the present disclosure, reference can be to the description of the embodiments on the power supply conversion circuit side of the present disclosure.

Those skilled in the art shall understand that the embodiments of the present disclosure may be provided as a method, a system, or a computer program product. Accordingly, the present disclosure may adopt a form of a hardware embodiment, a software embodiment, or an embodiment combining software and hardware. Moreover, the present disclosure may adopt a form of a computer program product implemented on one or more computer-usable storage media (including, but not limited to, disk storage and optical storage, etc.) including computer-usable program codes.

The present disclosure is described with reference to flowcharts and/or block diagrams of the method, the device (system), and the computer program product according to the embodiments of the present disclosure. It should be understood that each process and/or block in the flowcharts and/or block diagrams, and a combination of processes and/or blocks in the flowcharts and/or block diagrams can be realized by computer program instructions. These computer program instructions can be provided to a processor of a general-purpose computer, a special-purpose computer, an embedded processor, or other programmable data processing device to generate a machine, such that instructions executed by the processor of the computer or other programmable data processing devices generate an apparatus for implementing functions specified in one or more processes in the flowchart and/or one or more blocks in the block diagram.

These computer program instructions can also be stored in a computer-readable memory that can guide a computer or other programmable data processing devices to work in a specific manner, such that instructions stored in the computer-readable memory produce an article of manufacture including an instruction device. The instruction device implements functions specified in one or more processes in the flowchart and/or one or more blocks in the block diagram.

These computer program instructions can also be loaded on a computer or other programmable data processing devices to enable a series of operation steps to be executed on the computer or other programmable devices for producing computer-implemented processing, such that instructions executed on the computer or other programmable devices provide steps for implementing functions specified in one or more processes in the flowchart and/or one or more blocks in the block diagram.

The above embodiments are only preferred embodiments of the present disclosure and are not intended to limit the protection scope of the present disclosure.

INDUSTRIAL APPLICABILITY

In the embodiments of the present disclosure, the transformer secondary side can directly interact with the electric load via the first direct-current conversion circuit, and adjust the secondary output voltage of the secondary transformer coil to the target voltage based on the predetermined demand voltage of the electric load, without feeding the predetermined demand voltage via the feedback circuit back to the transformer primary side for an adjustment by the transformer primary side, thereby increasing the efficiency of the power supply conversion.

What is claimed is:

1. A voltage conversion circuit, comprising:
a primary transformer coil;
a secondary transformer coil; and
a first direct-current conversion circuit, wherein:
the primary transformer coil is coupled to the secondary transformer coil,
the secondary transformer coil is connected to the first direct-current conversion circuit,
the first direct-current conversion circuit is connected to an electric load,
the primary transformer coil is configured to generate, based on an initial voltage inputted to the primary transformer coil, an electromagnetic field and couple the electromagnetic field to the secondary transformer coil,
the secondary transformer coil is configured to generate an induced current by the electromagnetic field, generate a secondary output voltage based on the induced current, and transmit the secondary output voltage to the first direct-current conversion circuit, and
the first direct-current conversion circuit is configured to adjust, based on a predetermined demand voltage of the electric load, the secondary output voltage to obtain a target voltage,
wherein the voltage conversion circuit further comprises, in response to the initial voltage being an alternating current voltage provided by an alternating current power supply:
a rectifier-filter circuit connected between the alternating current power supply and the primary transformer coil and configured to convert an alternating current into a direct current,
wherein a pulse width modulation circuit is connected between the rectifier-filter circuit and the primary transformer coil; and
the pulse width modulation circuit is configured to generate, based on a current signal outputted by the rectifier-filter circuit, a pulse square wave, and apply the pulse square wave to the primary transformer coil.

2. The voltage conversion circuit according to claim 1, wherein the first direct-current conversion circuit comprises a switching direct-current boost circuit, the switching direct-current boost circuit being configured to boost, based on the predetermined demand voltage of the electric load through an on-off control performed on the switching direct-current boost circuit, the secondary output voltage to obtain the target voltage.

3. The voltage conversion circuit according to claim 2, wherein the switching direct-current boost circuit comprises a first inductor, a first switch, a first diode, and a first capacitor, wherein:
a first charge loop is formed by connecting a first terminal of the secondary transformer coil to a first end of the first inductor, connecting a second end of the first inductor to a first end of the first switch, and connecting and grounding a second end of the first switch and a second terminal of the secondary transformer coil;
a first discharge loop is formed by connecting the second end of the first inductor to an anode of the first diode, connecting a cathode of the first diode to a positive electrode of the first capacitor, and connecting and grounding a negative electrode of the first capacitor and the second end of the first switch;
the first switch is configured to: switch on the first charge loop based on a first predetermined control signal, or switch on the first discharge loop based on a second predetermined control signal;
the first inductor is configured to: store, in response to switching-on of the first charge loop, energy through an output current of the secondary transformer coil, or allow, in response to switching-on of the first discharge loop, the first capacitor to discharge;
the first diode is configured to isolate, in response to the switching-on of the first charge loop, the first capacitor from discharging to the ground;
the electricity load and the first capacitor are connected in parallel; and
the first capacitor is configured to: store, in response to the switching-on of the first discharge loop, power through the secondary transformer coil and the first inductor simultaneously, allowing an output voltage across two ends of the first capacitor to be higher than the secondary output voltage of the secondary transformer coil, and provide, as the target voltage, the output voltage across two ends of the first capacitor to the electric load.

4. The voltage conversion circuit according to claim 3, wherein the switching direct-current buck circuit comprises at least one of a BUCK circuit, a BUCK/BOOST circuit, a charge pump circuit, or a CUK circuit.

5. The voltage conversion circuit according to claim 2, wherein the switching direct-current boost circuit comprises at least one of a BOOST circuit, a BUCK/BOOST circuit, a charge pump circuit, or a CUK circuit.

6. The voltage conversion circuit according to claim 1, wherein the first direct-current conversion circuit comprises a switching direct-current buck circuit, the switching direct-current buck circuit being configured to reduce, based on the predetermined demand voltage of the electric load through an on-off control performed on the switching direct-current buck circuit, the secondary output voltage to obtain the target voltage.

7. The voltage conversion circuit according to claim 6, wherein the switching direct-current buck circuit comprising a second switch, a second diode, a second inductor, and a second capacitor, wherein:
a second charge loop is formed by connecting a first terminal of the secondary transformer coil to a first end of the second switch, connecting a second end of the second switch to a first end of the second inductor, connecting a second end of the second inductor to a positive electrode of the second capacitor, and connecting and grounding a negative electrode of the second capacitor and a second terminal of the secondary transformer coil;

a second discharge loop is formed by connecting the first end of the second inductor to a cathode of the second diode, and simultaneously connecting and grounding an anode of the second diode, the second terminal of the secondary transformer coil, and the negative electrode of the second capacitor;

the second switch is configured to: switch on the second charge loop based on a first predetermined control signal, or switch on the second discharge loop based on a second predetermined control signal;

the second inductor is configured to: store, in response to switching-on of the second charge loop, energy through an output current of the secondary transformer coil, or allow, in response to switching-on of the second discharge loop, the second capacitor to discharge;

the second diode is configured to isolate, in response to the switching-on of the second charge loop, the secondary transformer coil from discharging to the ground;

the electric load and the second capacitor are connected in parallel; and the second capacitor is configured to: discharge, in response to the switching-on of the second discharge loop, simultaneously with the second inductor, allowing an output voltage across two ends of the second capacitor to be lower than the secondary output voltage of the secondary transformer coil, and provide, as the target voltage, the output voltage across two ends of the second capacitor to the electric load.

8. The voltage conversion circuit according to claim 1, wherein the first direct-current conversion circuit comprises a switching direct-current boost-buck circuit, the switching direct-current boost-buck circuit being configured to boost or reduce, based on the predetermined demand voltage of the electric load through an on-off control performed on the switching direct-current boost-buck circuit, the secondary output voltage to obtain the target voltage.

9. The voltage conversion circuit according to claim 8, wherein the switching direct-current boost-buck circuit comprising a third switch, a third inductor, a third diode, and a third capacitor, wherein:

a third charge loop is formed by connecting a first terminal of the secondary transformer coil to a first end of the third switch, connecting a second end of the third switch to a first end of the third inductor, and connecting a second end of the third inductor to a second terminal of the secondary transformer coil;

a third discharge loop is formed by connecting the first end of the third inductor to a cathode of the third diode, connecting the second end of the third inductor to a positive electrode of the third capacitor, and connecting a negative electrode of the third capacitor to an anode of the third diode;

the third inductor, the third capacitor, and the electric load are connected in parallel;

the third switch is configured to: switch on the third charge loop based on a first predetermined control signal, or switch on the third discharge loop based on a second predetermined control signal;

the third inductor is configured to: store, in response to switching-on of the third charge loop, energy through an output current of the secondary transformer coil; or discharge, in response to switching-on of the third discharge loop, to the electric load simultaneously with the third capacitor;

the third diode is configured to isolate, in response to the switching-on of the third discharge loop, the third inductor from discharging to the third capacitor;

the third capacitor is configured to: supply, in response to the switching-on of the third discharge loop and in response to an induced electromotive force on the third inductor being higher than an output voltage across two ends of the third capacitor, power to the electric load simultaneously with the third inductor, allowing the output voltage across two ends of the third capacitor to be higher than the secondary output voltage of the secondary transformer coil, and provide, as the target voltage, the output voltage across two ends of the third capacitor to the electric load; and the third capacitor is further configured to: supply, in response to the switching-on of the third discharge loop and in response to the induced electromotive force on the third inductor being lower than the output voltage across two ends of the third capacitor, power to the electric load, allowing the output voltage across two ends of the third capacitor to be lower than the secondary output voltage of the secondary transformer coil, and provide, as the target voltage, the output voltage across two ends of the third capacitor to the electric load.

10. The voltage conversion circuit according to claim 1, further comprising a first filter capacitor connected in parallel between two ends of the secondary transformer coil and the first direct-current conversion circuit, the first filter capacitor being configured to boost the secondary output voltage to prevent the secondary output voltage from being lower than a minimum operating voltage of the first direct-current conversion circuit.

11. The voltage conversion circuit according to claim 10, wherein the initial voltage is provided by a power supply, and wherein the power supply conversion circuit further comprises a second direct-current conversion circuit having an input end connected to an output end of the power supply, and an output end connected to the primary transformer coil, the second direct-current conversion circuit being configured to adjust, based on a predetermined operating voltage of the primary transformer coil, the initial voltage to obtain a target operating voltage of the primary transformer coil.

12. The voltage conversion circuit according to claim 11, further comprising:

a second filter capacitor in a parallel connection with the second direct-current conversion circuit, and configured to boost the initial voltage to prevent the initial voltage from being lower than a minimum operating voltage of the second direct-current conversion circuit.

13. A voltage conversion method, applied in a voltage conversion circuit, the voltage conversion circuit comprising:

a primary transformer coil;

a secondary transformer coil; and a first direct-current conversion circuit, wherein:

the primary transformer coil is coupled to the secondary transformer coil, the secondary transformer coil is connected to the first direct-current conversion circuit, the first direct-current conversion circuit is connected to an electric load, the primary transformer coil is configured to generate, based on an initial voltage inputted to the primary transformer coil, an electromagnetic field and couple the electromagnetic field to the secondary transformer coil, the secondary transformer coil is configured to generate an induced current by the electromagnetic field, generate a secondary output voltage based on the induced current, and transmit the secondary output voltage to the first direct-current conversion circuit, and the first direct-current conversion circuit is configured to adjust, based on a predetermined demand voltage of the electric load, the secondary output voltage to obtain a target voltage, wherein the voltage conversion circuit further comprises in response to the initial voltage being an alternating current voltage provided by an alternating current power supply:

a rectifier-filter circuit connected between the alternating current power supply and the primary transformer coil and configured to convert an alternating current into a direct current, wherein a pulse width modulation circuit is connected between the rectifier-filter circuit and the primary transformer coil; and the pulse width modulation circuit is configured to generate, based on a current signal outputted by the rectifier-filter circuit, a pulse square wave, and apply the pulse square wave to the primary transformer coil, the method comprising:

generating, by the primary transformer coil based on an initial voltage inputted to the primary transformer coil, the electromagnetic field, and coupling the electromagnetic field to the secondary transformer coil;

generating, by the secondary transformer coil based on the electromagnetic field, the induced current, generating the secondary output voltage based on the induced current, and transmitting the secondary output voltage to the first direct-current conversion circuit; and adjusting, by the first direct-current conversion circuit based on the predetermined demand voltage of the electric load, the secondary output voltage to obtain the target voltage.

14. The method according to claim 13, wherein the first direct-current conversion circuit comprises a switching direct-current boost circuit; and wherein said adjusting, by the first direct-current conversion circuit based on the predetermined demand voltage of the electric load, the secondary output voltage to obtain the target voltage comprises:

boosting, based on the predetermined demand voltage of the electric load through an on-off control performed on the switching direct-current boost circuit, the secondary output voltage to obtain the target voltage.

15. The method according to claim 13, wherein the first direct-current conversion circuit comprises a switching direct-current buck circuit; and wherein said adjusting, by the first direct-current conversion circuit based on the predetermined demand voltage of the electric load, the secondary output voltage to obtain the target voltage comprises:

reducing, based on the predetermined demand voltage of the electric load through an on-off control performed on the switching direct-current buck circuit, the secondary output voltage to obtain the target voltage.

16. The method according to claim 13, wherein the first direct-current conversion circuit comprises a switching direct-current boost-buck circuit; and wherein said adjusting, by the first direct-current conversion circuit based on the predetermined demand voltage of the electric load, the secondary output voltage to obtain the target voltage comprises:

boosting or reducing, based on the predetermined demand voltage of the electric load through an on-off control performed on the switching direct-current boost-buck circuit, the secondary output voltage to obtain the target voltage.

17. The method according to claim 13, wherein the voltage conversion circuit further comprises a first filter capacitor connected in parallel between two ends of the secondary transformer coil and the first direct-current conversion circuit; and wherein the method further comprises:

boosting, by the first filter capacitor, the secondary output voltage to prevent the secondary output voltage from being lower than a minimum operating voltage of the first direct-current conversion circuit.

18. The method according to claim 13, wherein:

the initial voltage is provided by a power supply;

the voltage conversion circuit further comprises a second direct-current conversion circuit having an input end connected to an output end of the power supply, and an output end connected to the primary transformer coil; and the method further comprises:

adjusting, by the second direct-current conversion circuit based on a predetermined operating voltage of the primary transformer coil, the initial voltage to obtain a target operating voltage of the primary transformer coil.

* * * * *